United States Patent
Rana et al.

(10) Patent No.: US 9,258,363 B2
(45) Date of Patent: Feb. 9, 2016

(54) DATA CUBE HIGH AVAILABILITY

(75) Inventors: Siddharth Rana, Bothell, WA (US); Govind Saoji, Redmond, WA (US); Bhavini Soneji, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 1079 days.

(21) Appl. No.: 12/945,950

(22) Filed: Nov. 15, 2010

(65) Prior Publication Data

US 2012/0124000 A1    May 17, 2012

(51) Int. Cl.
| | |
|---|---|
| G06F 7/00 | (2006.01) |
| H04L 29/08 | (2006.01) |
| G06F 11/20 | (2006.01) |
| G06F 11/16 | (2006.01) |

(52) U.S. Cl.
CPC ........ *H04L 67/1095* (2013.01); *G06F 11/2038* (2013.01); *G06F 11/2097* (2013.01); *G06F 11/1662* (2013.01)

(58) Field of Classification Search
None
See application file for complete search history.

(56) References Cited

U.S. PATENT DOCUMENTS

| | | | | |
|---|---|---|---|---|
| 5,701,480 | A * | 12/1997 | Raz ............................... | 718/101 |
| 6,601,076 | B1 * | 7/2003 | McCaw et al. ........................ | 1/1 |
| 7,113,993 | B1 * | 9/2006 | Cappiello et al. ............. | 709/227 |
| 7,299,378 | B2 * | 11/2007 | Chandrasekaran et al. .... | 714/15 |
| 7,743,015 | B2 | 6/2010 | Schmitt | |
| 2002/0107876 | A1 * | 8/2002 | Tsuchida et al. ............... | 707/202 |
| 2003/0028509 | A1 * | 2/2003 | Sah et al. ........................... | 707/1 |
| 2006/0004779 | A1 * | 1/2006 | Rossiter et al. .................. | 707/10 |
| 2009/0240663 | A1 * | 9/2009 | Plattner et al. ..................... | 707/3 |
| 2010/0005124 | A1 * | 1/2010 | Wagner ......................... | 707/202 |
| 2010/0161361 | A1 * | 6/2010 | Spears et al. ...................... | 705/7 |
| 2014/0317149 | A1 * | 10/2014 | Friedt et al. ................... | 707/802 |

OTHER PUBLICATIONS

Denny Lee; SQL Server 2008; Scale-Out Querying for Anaylsis Services with Read-Only Databases; Jun. 2010; Microsoft; pp. 8-15.*

"High Availability (Analysis Services—Multidimensional Data)", Retrieved at <<http://technet.microsoft.com/en-us/library/bb500217.aspx>>, Retrieved on Oct. 5, 2010, pp. 1.

"Managing the Availability and Fault Tolerance of your SQL Server", Retrieved at <<http://i.dell.com/sites/content/business/smb/sb360/en/Documents/Wp-Sql-Availability.pdf>>, Retrieved on Oct. 4, 2010, pp. 9.

Nigam, Samir, "Enterprise Database Development in Sybase® WorkSpace", Retrieved at <<http://www.sybase.com/content/1036160/L02710_Ent_DB_Dev_WP.pdf>>, Retrieved on Oct. 4, 2010, pp. 12.

(Continued)

*Primary Examiner* — Ajith Jacob
(74) *Attorney, Agent, or Firm* — Kate Drakos; Micky Minhas

(57) ABSTRACT

The subject disclosure is directed towards making cube data highly available and efficient to access by separating the read cube server from the processing cube server, on different physical machines. The read cube server may be mirrored, and the write cube server may be mirrored. When the primary read cube server is not operational (e.g., has failed) or is having its read cube synchronized, the read queries are handled by the mirror read cube server. When a processing cube server (or its write cube) is not operational, its mirror processing cube server takes over and performs cube processing operations via its mirror write cube.

20 Claims, 6 Drawing Sheets

(56) References Cited

OTHER PUBLICATIONS

Lee et al., "SQL Server Best Practices Article", Retrieved at <<http://msdn.microsoft.com/en-us/library/cc966449.aspx>>, Jun. 13, 2007, pp. 8.

"Accelerating Microsoft adCenter with Microsoft SQL Server 2008 Analysis Services", Retrieved at <<http://download.microsoft.com/download/4/B/E/4BEB8A88-674A-4F4F-B19E-98E377E3C62D/0873_AceleratingMicrosoftadCenterwithMicrosoftSQLServer2008-AnalysisServices.doc>>, Aug. 2009, pp. 25.

Ballard, et al., "Enabling Robust Business Analytics with InfoSphere Warehouse Cubing Services", Retrieved at <<http://www.redbooks.ibm.com/redpapers/pdfs/redp4514.pdf>>, Retrieved on Oct. 4, 2010, pp. 34.

"Analysis Services Optimization Tips", Retrieved at <<http://www.mssqlcity.com/Tips/olap_optimization.htm>>, Retrieved on Oct. 4, 2010, pp. 3.

* cited by examiner

DATA CUBE HIGH AVAILABILITY

BACKGROUND

A data cube, such as a Microsoft® SQL Server Analysis Services cube, is a three-dimensional (or higher) database structure for storing and presenting data. Users of such a cube want their data to be highly available, with minimum interruptions in the event of hardware or software faults. However, there was heretofore not any consistent way to ensure highly available cubes, including highly available cubes in which data access remains efficient, even in heavy traffic.

SUMMARY

This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

Briefly, various aspects of the subject matter described herein are directed towards a technology by which a read cube server that handles read queries runs on a separate machine from a processing cube server that handles writes (data changes). Moreover, the read cube server may be mirrored, and the processing cube server may be mirrored. As a result of handling reads and writes on separate, mirrored machines, cube data is highly available and access to that data is efficient.

In one aspect, a primary read cube server handles incoming read queries by returning data from a primary read cube. When the primary read cube server is not operational or when the primary read cube is being synchronized, a mirror read cube server coupled to a mirror read cube handles the incoming read queries by returning data from the mirror read cube.

The primary processing cube server coupled to a primary cube service writes change data to a primary write cube, and (e.g., periodically) synchronizes the mirror write cube and the read cubes based upon the change data. When the primary processing cube server and/or the primary processing cube is not operational, a mirror processing cube server takes over, writes data changes to the mirror write cube, and synchronizes the primary read cubes.

In one aspect, handling read queries (e.g., at a front end server component) includes determining whether a first read server having a first read cube is currently capable of handling the queries. If so, the queries are directed to the first read server; if not, the queries are directed to a second read server having a second read cube. For example, the front end server component decides that the first read cube server is not currently capable of handling the queries if the first read server is non-operational or if the first read cube is currently being synchronized.

Cube write data may be processed by a mirrored processing server, having a first cube service that synchronizes the read cubes and a mirror write cube. A mirror processing cube service takes over for the first processing cube service when the first processing server or the first write cube is not operational.

Other advantages may become apparent from the following detailed description when taken in conjunction with the drawings.

BRIEF DESCRIPTION OF THE DRAWINGS

The present invention is illustrated by way of example and not limited in the accompanying figures in which like reference numerals indicate similar elements and in which.

DETAILED DESCRIPTION

Various aspects of the technology described herein are generally directed towards providing high cube data availability with efficient operation for users (e.g., customers) in a datacenter environment. To this end, an architecture is provided including a dedicated server for cube data processing (e.g., an active processing cube server) and a dedicated server to which the front end servers query for cube data (e.g., an active read cube server). Further, the cube data processing server has a mirror (standby/backup) server, and the cube read server has a mirror server. Each of the servers corresponds to its own machine (or machine cluster), so that a hardware failure does not stop query processing or change data (write) processing.

As will be understood, the technology works on the concept of separating the cube processing server from the cube querying server, whereby cube processing does not affect the availability of the read cube. As a result, the architecture/pipeline that provides updated customer data in real time remains established, even if one of the processing servers is not available (whether crashed or temporarily unavailable), or one of the read servers is not available (whether crashed or temporarily unavailable).

It should be understood that any of the examples herein are non-limiting. For one, while "mirror" servers are described in the examples, a "mirror" server is not limited to a single standby server, and indeed may comprise more than one standby server, e.g., a third server may take over operations if the other two are not available, and so on. As such, the present invention is not limited to any particular embodiments, aspects, concepts, structures, functionalities or examples described herein. Rather, any of the embodiments, aspects, concepts, structures, functionalities or examples described herein are non-limiting, and the present invention may be used various ways that provide benefits and advantages in data storage and processing in general.

Figure 1:
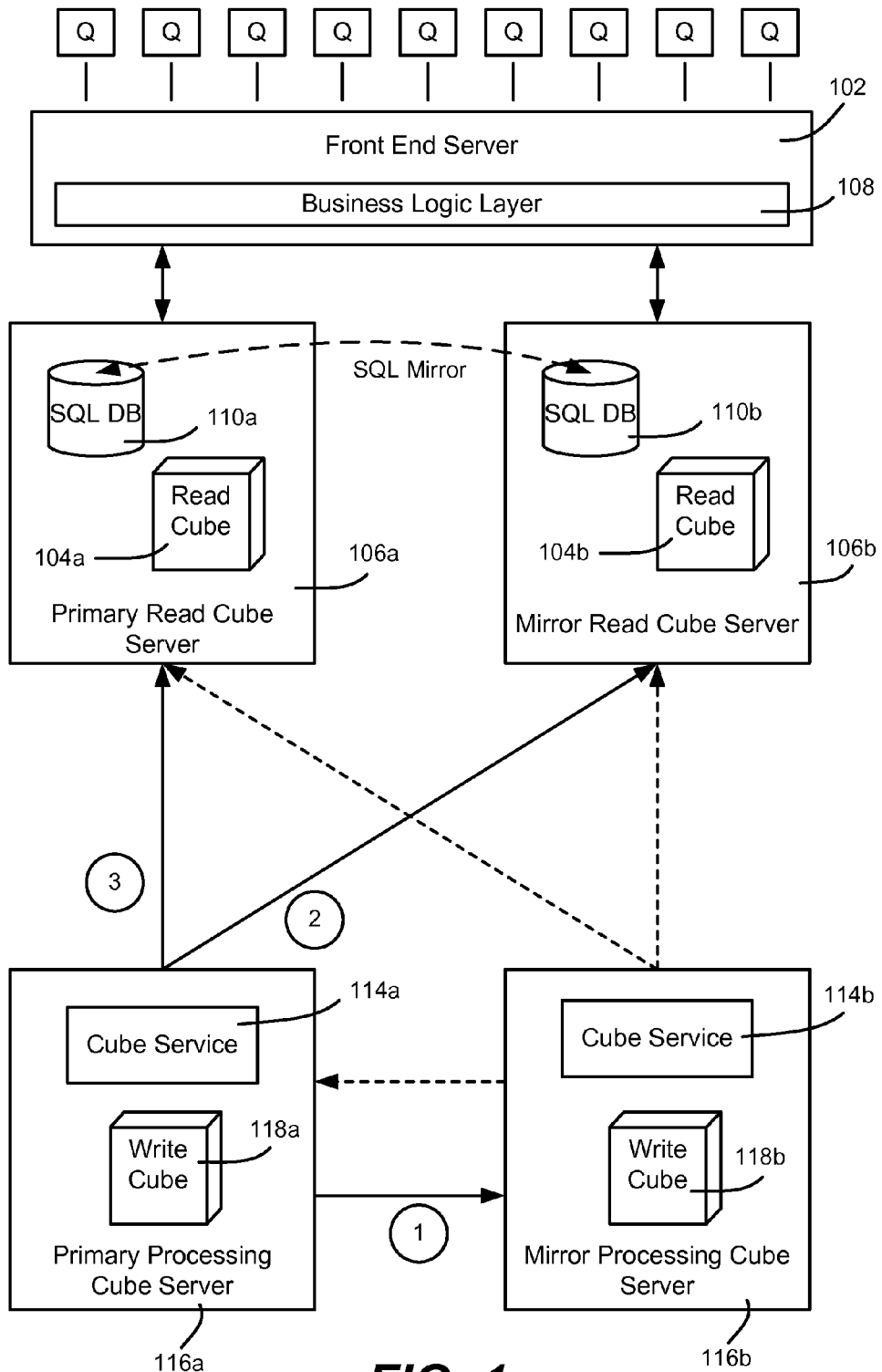
FIG. 1 is a block diagram representing an example architecture having primary and mirror read cube servers and read cubes that are separate and independent from primary and mirror processing cube servers and write cubes.

FIG. 1 shows example components of the architecture/pipeline for handling user queries directed towards a data cube. In FIG. 1, a front end server 102 (comprising one or more machines) receives queries, (e.g., MDX, or multidimensional queries each represented by Q), and in this example directs the read queries to a read cube 104a of the primary active read cube server 106a. Note that FIG. 1 shows the primary active read cube server 106a on the left of the diagram and the mirror active read cube server 106b on the right, however as described herein, the servers may change roles, e.g., what is shown as the primary may become inactive, whereby the mirror becomes active.

To determine to which server to direct the queries, a component (e.g., business logic layer) 108 at the front end server 102 makes a SQL query to the SQL database 110a to determine the state of the active read cube 104a; (note that the SQL databases are mirrored via its own, known technology). If the server 106a is not operational (in which event SQL indicates that the mirror database 110b was used), or is being synchronized (in which event SQL returns the state from the database 110a as "sync in progress"), then the layer 108 directs the queries Q to the other, currently passive read cube 104b (which now becomes active). Otherwise, (that is, the database returned "sync not in progress"), the layer directs the queries Q to the read cube 104a, which is active. Note that in the event that the synchronization is occurring on the primary read cube server 106a and the mirror read cube server 106b is not operational, then the read queries are blocked or held until the synchronization completes.

With respect to handling write data, the cube service 114a waits for notification for changes in the SQL database 110a and updates those changes into the active processing write cube 118a. Occasionally, e.g., periodically, the cube service 114a performs incremental data processing (or full cube processing if necessary) on the primary processing cube server 116a. On a notification to process incremental data, if the cube server 116a has failed, the cube service 114b takes over to perform the incremental processing.

Before performing any incremental processing with the database 110a, the cube service 116 ensures that the processing cube 118a is synchronized with the last updated data in the database 110a. To this end, at the end of processing of the cube 118a, the cube service 116 uploads a timestamp into the database 110a and into the cube 118a. This timestamp is used on the next synchronization to determine whether the cube 118a is synchronized with the database 110a. If the cube service 114a determines that the cube 114a is not synchronized with the database 110a, the service 114a performs a full processing operation instead of an incremental processing operation.

To summarize, the synchronization operations and synchronization state is controlled by the cube service 114a or 114b that is currently operational. For example, in FIG. 1 the cube service 114a of the processing cube server 116a is currently operational. The write cube 118a maintains the write data that is to be synchronized to the other machines, which is regularly performed as needed, e.g., periodically such as every few minutes.

In one implementation, synchronization proceeds in a specific sequence, represented in FIG. 1 by the arrows labeled with circled numerals one through three. First, the write cube 118b is synchronized with the data on the write cube 118a; this allows the mirror processing cube server 116b to take over (as described below) in the event of failure of the primary processing cube server 116a. Secondly, the read cube on the read cube server that is not actively servicing read queries is synchronized, e.g., the read cube 104b on the read cube server 106b. Thirdly, the other read cube (104a in this example) is synchronized. As mentioned above, when a read cube is synchronized, its machine's SQL database is marked as "synch in progress" so that queries are directed to the other read cube server during the synchronization process. The synchronization sequence ensures that even if a failover happens, the users always get data which is not older than that in the current primary read server. Alternative synchronization operations are possible, e.g., in parallel at least to an extent.

The synchronization order ensures that the processing mirror cube is synchronized even if the read cubes are not, whereby if a failover of the cube service (or the processing machine) occurs, the mirrored the cube service incrementally processes from there, without having to issue a full cube process. Further, after the read mirror cube is synchronized, if there is a read cube failover, the read queries are directed from the read primary cube to the read mirror cube. Because the read mirror cube is synchronized before the read primary cube, the customer starts getting recent data even after failover (instead of getting old data instead of new if the read cube synchronization order was reversed).

Note that in FIG. 1, the dashed arrows represent the same synchronization operations when the cube service 114b of the mirror active processing cube server 116b is in control. Failure of a processing server transfers control, as described below. Note that the databases 110a and 110b maintain information as to which cube processing server 116a or 116b is currently in control, as well as which cube read server 106a or 106b is currently active.

Figure 2:
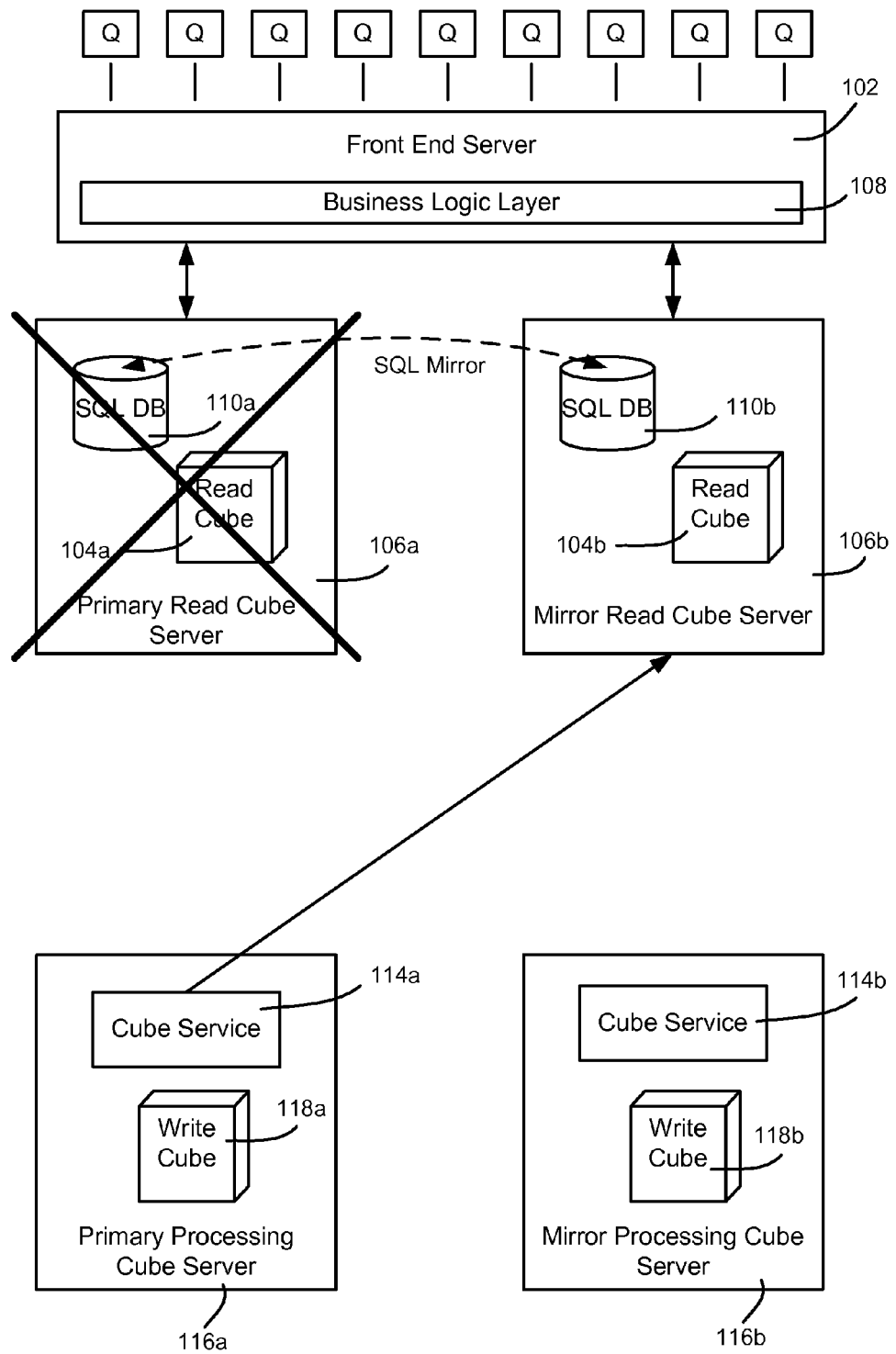
FIG. 2 is a block diagram representing the example architecture in FIG. 1 in which the primary read cube server has failed over to the mirror read cube server.

FIG. 2 represents various aspects of failure of a read cube server, shown by the crossed-out lines over server 106a. As described above, the layer 108 of the front end server 102 reads the synchronization state maintained in the database 110a, which in normal operation is "synch in progress" or "synch not in progress." In the event of a failure, the SQL query result indicates that the mirror database 110b was read, and thus that the mirror read cube server 106b is active. Also, the cube service 114a can listen to database failover events, e.g., by monitoring for the failover of the SQL database to know which machine has the primary database and which has the mirror database.

If the state is "synch in progress" then read queries to be directed to the cube 104b are blocked/held until the synchronization completes and "synch not in progress" is written by the processing cube server. Thus, when the primary read query server 106a goes down, the mirror query cube server 106b takes over servicing queries. For the (very small) window of time when cube synchronization may be in progress at the active read cube server, queries to this server are blocked until the synchronization operation is complete.

Figure 3:
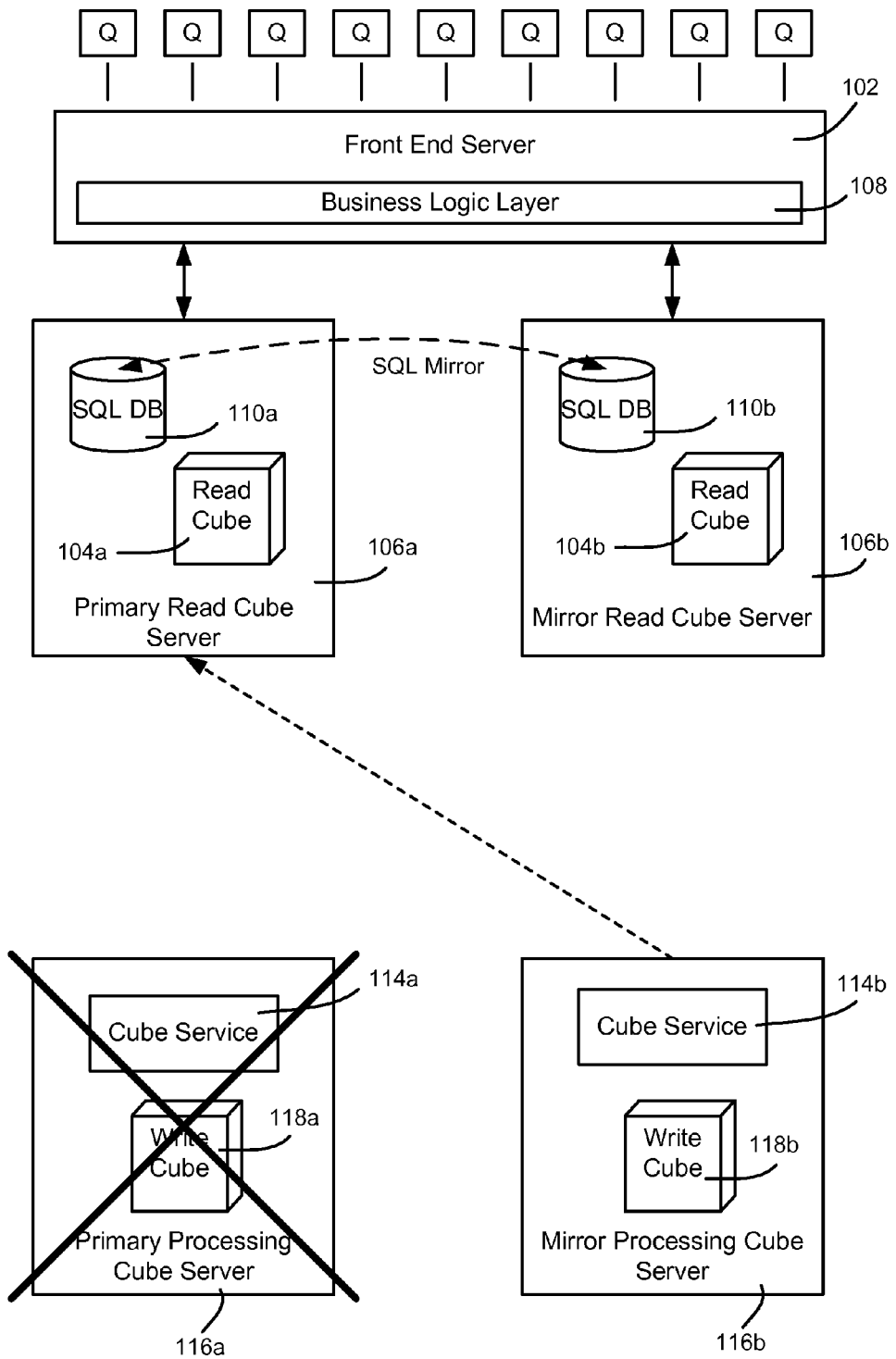
FIG. 3 is a block diagram representing the example architecture in FIG. 1 in which the primary processing cube server has failed over to the mirror processing cube server.

FIG. 3 represents various aspects of failure of a processing cube server, shown by the crossed-out lines over the server 116a. Note that this may be because of a crash, or because an operator intentionally decides to switch off the machine, e.g., for maintenance, (although for intentional maintenance, it may be desirable to first move the service into a pause mode which occurs only after completing or cancelling any current transaction). In any event, on failover the mirror processing cube server 116b takes over the active role.

As part of performing its operations, the active processing cube server (e.g., 116a) writes a schedule of operations to perform to the database 110a, and begins performing the scheduled operations. In the event that the processing server 116a goes down, the mirror processing server 116b detects this non-operational state (via a known mechanism) and takes over, whereby users will still have the latest data surfaced to the read cubes. When the mirror processing server 116b takes over the principal role, the mirror processing server 116b continues processing the schedule from where the failed server 116a left off.

Another type of failure is that of the primary processing cube 118a. If this cube 118a is not operational, e.g., unavailable or fails for some reason, the cube service 114a tries to re-connect to update it. If the cube service 114a fails to update the processing cube 118a, the cube service 114a may raise an event to notify an administrator/operator, and the update attempt fails some number of times, e.g., three, the cube service 114a exits to allows the mirror cube service 114b to take over the active role, with the backup processing cube 118b being active. As used herein, "not operational" refers to the service and/or the cube failing for any reason, whether unintentional (e.g., a machine crash), intentional (e.g., the machine is taken down for maintenance) or for any other reason (e.g., the service has a bug, the cube is non-responsive, and so on). Similarly, "not operational" refers to the read cube server machine or any of the components therein being in a failed state for any reason.

Turning to another aspect, the read cube sometimes needs to be rebuilt in its entirety from the SQL database, such as if the SQL database crashes and is restored from a backup. More particularly, when a SQL database is backed up, there is no guarantee that the backed SQL database and the cube database are synchronized, and thus whenever the SQL database is restored, the cube service needs to perform full cube processing to ensure that it is synchronized with the restored database.

Rebuilding of the processing cube may take a relatively long time, on the order of hours. However, this does not affect the performance of the read cube, because it is independent, on a separate machine. Similarly, long running queries handled by the read cube server do not affect the performance of cube processing on the processing cube server, because cube processing is independent of query handling and is performed on a separate machine.

The following table provides example fields that may be maintained on the mirrored SQL database 110a and 110b:

nized with the SQL database. Otherwise the cube service continues to handle notifications until notified to stop at step 412.

Exemplary Networked and Distributed Environments

One of ordinary skill in the art can appreciate that the various embodiments and methods described herein can be implemented in connection with any computer or other client or server device, which can be deployed as part of a computer network or in a distributed computing environment, and can be connected to any kind of data store or stores. In this regard, the various embodiments described herein can be implemented in any computer system or environment having any number of memory or storage units, and any number of applications and processes occurring across any number of storage units. This includes, but is not limited to, an environment with server computers and client computers deployed in a network environment or a distributed computing environment, having remote or local storage.

Distributed computing provides sharing of computer resources and services by communicative exchange among computing devices and systems. These resources and services include the exchange of information, cache storage and disk storage for objects, such as files. These resources and services also include the sharing of processing power across multiple processing units for load balancing, expansion of resources, specialization of processing, and the like. Distributed computing takes advantage of network connectivity, allowing clients to leverage their collective power to benefit the entire enterprise. In this regard, a variety of devices may have applications, objects or resources that may participate in the

| Column Name | Type | Allow Null | Description |
| --- | --- | --- | --- |
| Cube Label | nvarchar(100) | No | At the end of incremental processing or full processing, a label or timestamp will be applied in both SQL database and Cube. |
| IsFullCubeProcessingInProgress | Bool | No | True when full cube processing progress |
| FullCubeProcessingStartTime | Datetime | Yes | Update time as the beginning of full cube processing |
| FullCubeProcessingEndTime | Datetime | Yes | Update time at the end of full cube processing |
| LastIncrementalProcessingTime | Datetime | Yes | Update time at the end of each incremental processing |
| IsInPauseMode | Bool | No | True if cube is requested in pause mode and cube service has agreed to this setting |
| IsAutoSyncEnabled | Bool | No | True if cube service is expected to sync to querying server after processing. |

Figure 4:
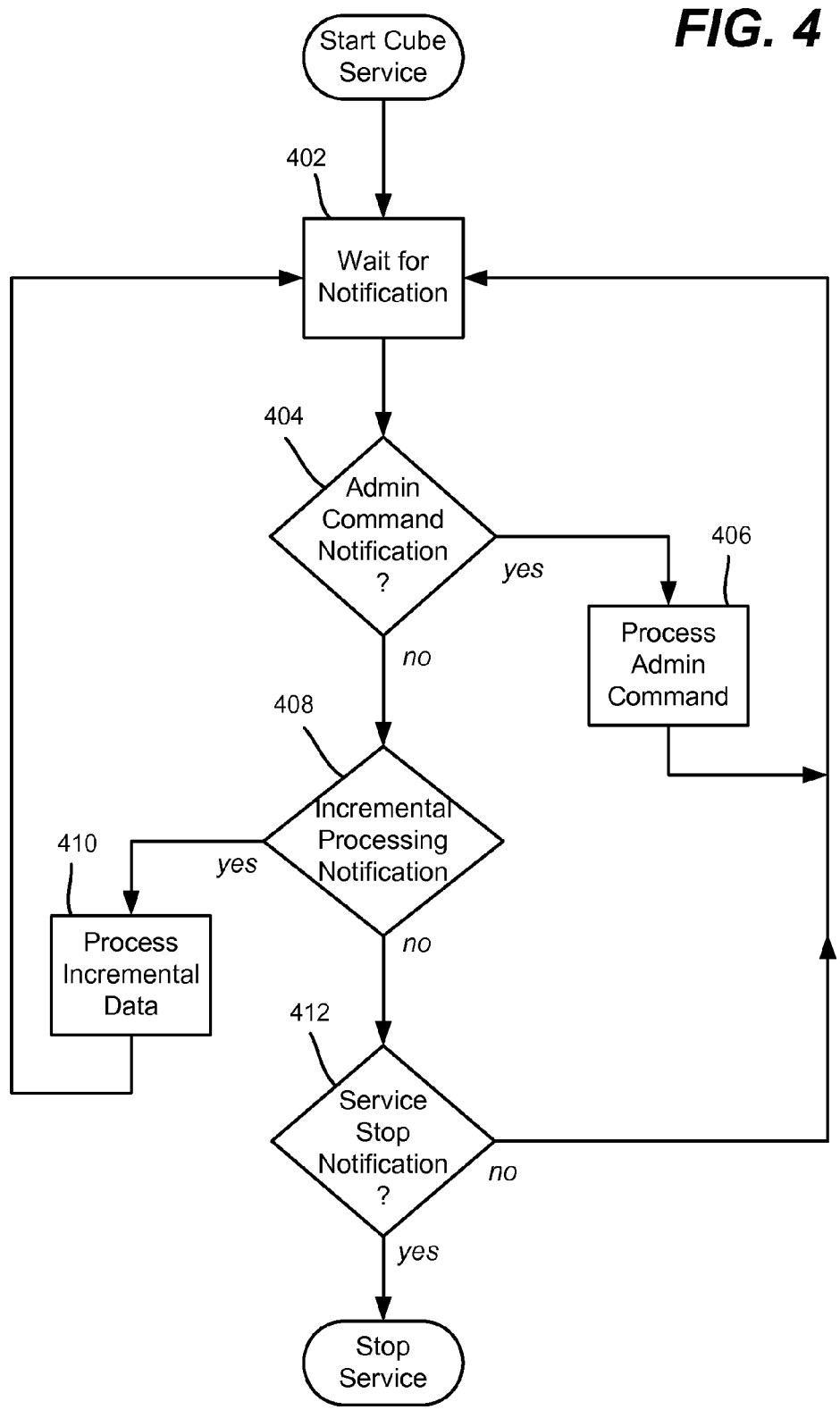
FIG. 4 is a flow diagram showing example steps that may be performed by a cube service running on a processing cube server.

FIG. 4 is a flow diagram showing example steps of the cube service when running. In general, the cube service operates based upon notifications, as represented in FIG. 4 via block 402. If the notification is an administrator command, as evaluated at step 404, the command is processed at step 406.

If the command is an incremental processing notification as evaluated at step 408, at step 410 the cube service processes the cube with the incremental data corresponding to the notification. Note that although not explicitly shown in FIG. 4, as described above the processing represented by step 410 may fail if the write cube has failed, whereby an alert may be raised and/or the cube service may exit to allow the mirror cube service to take over. The cube service may also take action (e.g., raise an alert) if it detects that the cube is not synchroresource management mechanisms as described for various embodiments of the subject disclosure.

Figure 5:
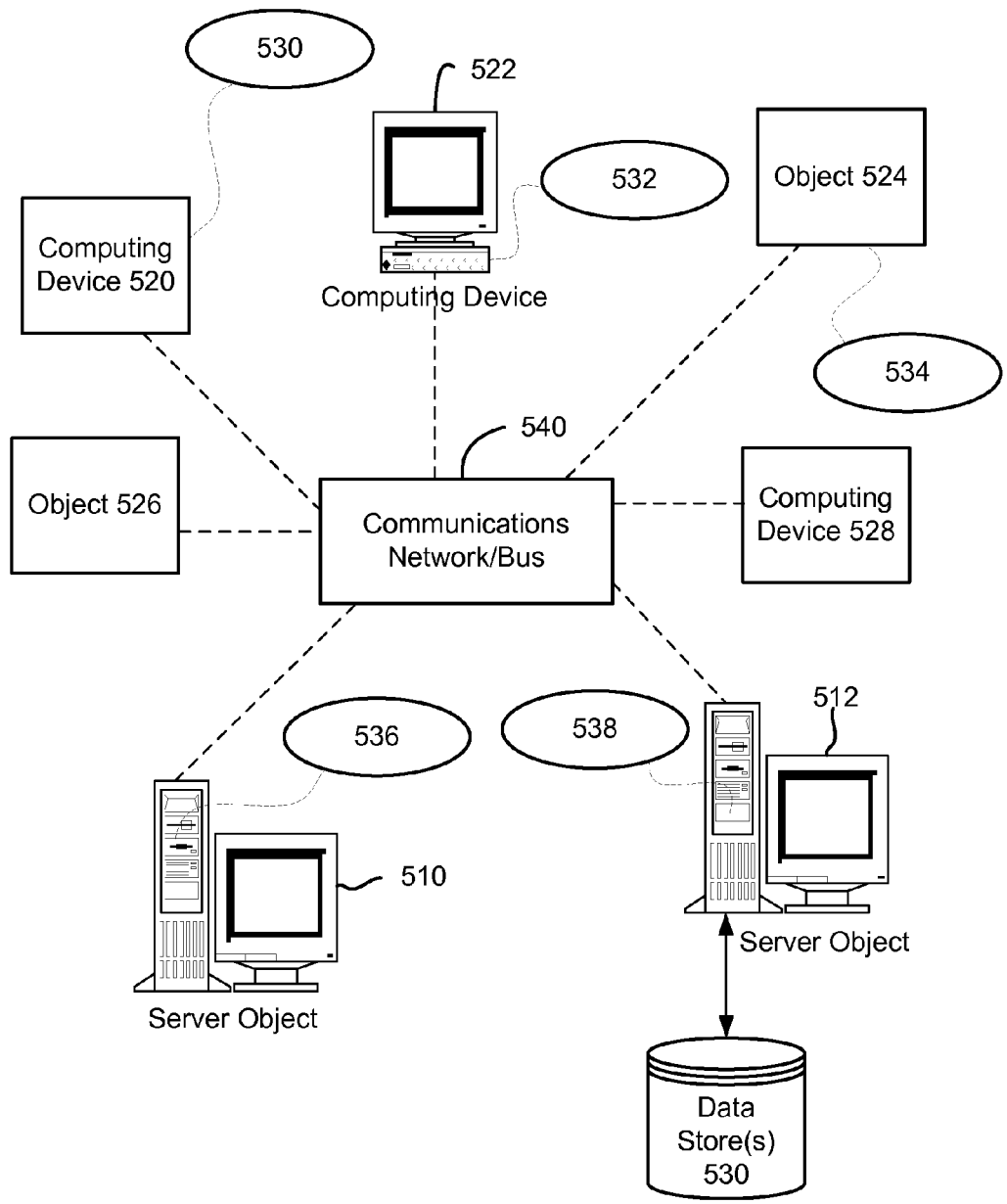
FIG. 5 is a block diagram representing exemplary non-limiting networked environments in which various embodiments described herein can be implemented.

FIG. 5 provides a schematic diagram of an exemplary networked or distributed computing environment. The distributed computing environment comprises computing objects 510, 512, etc., and computing objects or devices 520, 522, 524, 526, 528, etc., which may include programs, methods, data stores, programmable logic, etc. as represented by example applications 530, 532, 534, 536, 538. It can be appreciated that computing objects 510, 512, etc. and computing objects or devices 520, 522, 524, 526, 528, etc. may comprise different devices, such as personal digital assistants (PDAs), audio/video devices, mobile phones, MP3 players, personal computers, laptops, etc.

Each computing object 510, 512, etc. and computing objects or devices 520, 522, 524, 526, 528, etc. can communicate with one or more other computing objects 510, 512, etc. and computing objects or devices 520, 522, 524, 526, 528, etc. by way of the communications network 540, either directly or indirectly. Even though illustrated as a single element in FIG. 5, communications network 540 may comprise other computing objects and computing devices that provide services to the system of FIG. 5, and/or may represent multiple interconnected networks, which are not shown. Each computing object 510, 512, etc. or computing object or device 520, 522, 524, 526, 528, etc. can also contain an application, such as applications 530, 532, 534, 536, 538, that might make use of an API, or other object, software, firmware and/or hardware, suitable for communication with or implementation of the application provided in accordance with various embodiments of the subject disclosure.

There are a variety of systems, components, and network configurations that support distributed computing environments. For example, computing systems can be connected together by wired or wireless systems, by local networks or widely distributed networks. Currently, many networks are coupled to the Internet, which provides an infrastructure for widely distributed computing and encompasses many different networks, though any network infrastructure can be used for exemplary communications made incident to the systems as described in various embodiments.

Thus, a host of network topologies and network infrastructures, such as client/server, peer-to-peer, or hybrid architectures, can be utilized. The "client" is a member of a class or group that uses the services of another class or group to which it is not related. A client can be a process, e.g., roughly a set of instructions or tasks, that requests a service provided by another program or process. The client process utilizes the requested service without having to "know" any working details about the other program or the service itself.

In a client/server architecture, particularly a networked system, a client is usually a computer that accesses shared network resources provided by another computer, e.g., a server. In the illustration of FIG. 5, as a non-limiting example, computing objects or devices 520, 522, 524, 526, 528, etc. can be thought of as clients and computing objects 510, 512, etc. can be thought of as servers where computing objects 510, 512, etc., acting as servers provide data services, such as receiving data from client computing objects or devices 520, 522, 524, 526, 528, etc., storing of data, processing of data, transmitting data to client computing objects or devices 520, 522, 524, 526, 528, etc., although any computer can be considered a client, a server, or both, depending on the circumstances.

A server is typically a remote computer system accessible over a remote or local network, such as the Internet or wireless network infrastructures. The client process may be active in a first computer system, and the server process may be active in a second computer system, communicating with one another over a communications medium, thus providing distributed functionality and allowing multiple clients to take advantage of the information-gathering capabilities of the server.

In a network environment in which the communications network 540 or bus is the Internet, for example, the computing objects 510, 512, etc. can be Web servers with which other computing objects or devices 520, 522, 524, 526, 528, etc. communicate via any of a number of known protocols, such as the hypertext transfer protocol (HTTP). Computing objects 510, 512, etc. acting as servers may also serve as clients, e.g., computing objects or devices 520, 522, 524, 526, 528, etc., as may be characteristic of a distributed computing environment.

Exemplary Computing Device

As mentioned, advantageously, the techniques described herein can be applied to any device. It can be understood, therefore, that handheld, portable and other computing devices and computing objects of all kinds are contemplated for use in connection with the various embodiments. Accordingly, the below general purpose remote computer described below in FIG. 6 is but one example of a computing device.

Embodiments can partly be implemented via an operating system, for use by a developer of services for a device or object, and/or included within application software that operates to perform one or more functional aspects of the various embodiments described herein. Software may be described in the general context of computer executable instructions, such as program modules, being executed by one or more computers, such as client workstations, servers or other devices. Those skilled in the art will appreciate that computer systems have a variety of configurations and protocols that can be used to communicate data, and thus, no particular configuration or protocol is considered limiting.

Figure 6:
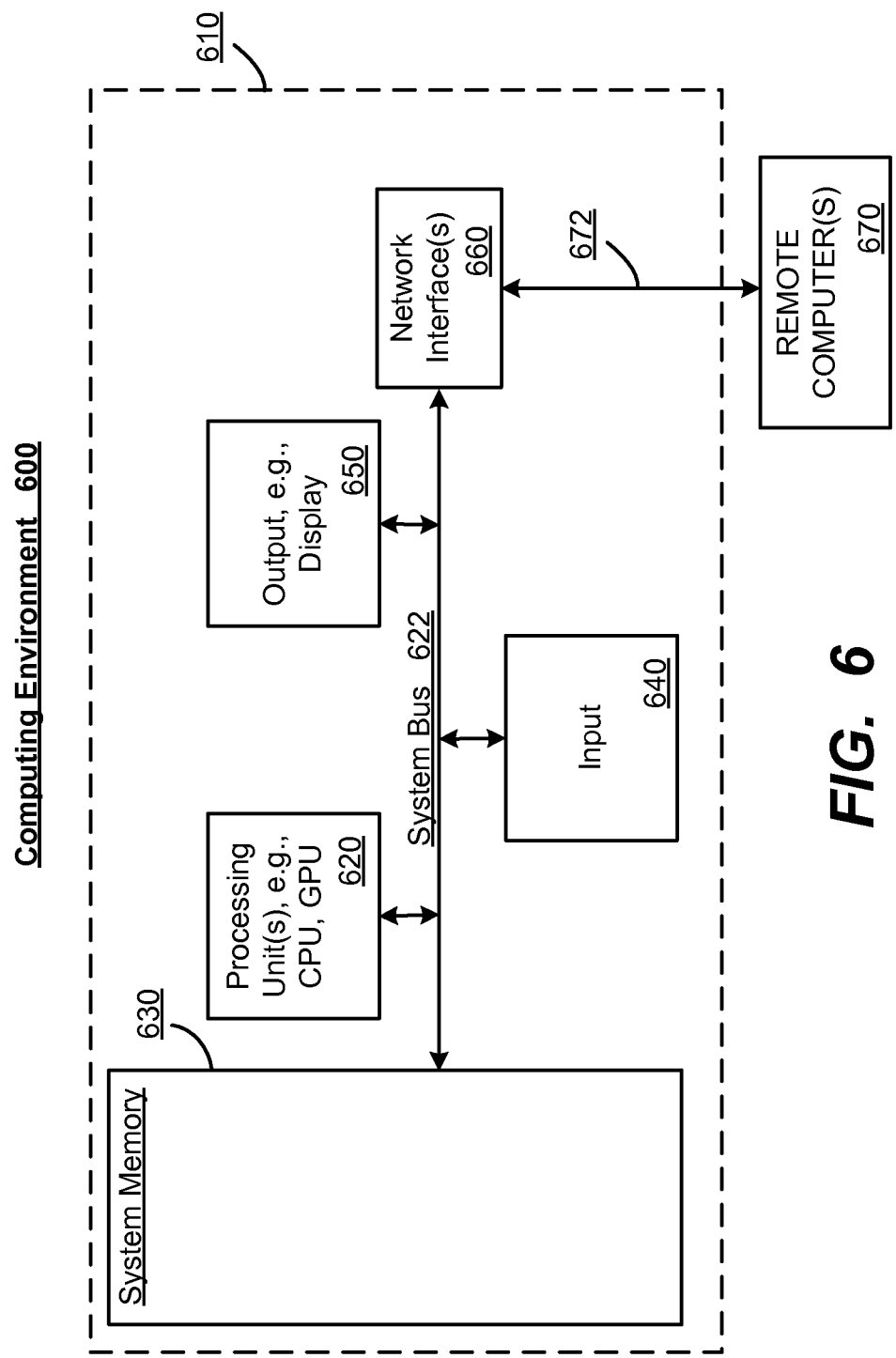
FIG. 6 is a block diagram representing an exemplary non-limiting computing system or operating environment in which one or more aspects of various embodiments described herein can be implemented.

FIG. 6 thus illustrates an example of a suitable computing system environment 600 in which one or aspects of the embodiments described herein can be implemented, although as made clear above, the computing system environment 600 is only one example of a suitable computing environment and is not intended to suggest any limitation as to scope of use or functionality. In addition, the computing system environment 600 is not intended to be interpreted as having any dependency relating to any one or combination of components illustrated in the exemplary computing system environment 600.

With reference to FIG. 6, an exemplary remote device for implementing one or more embodiments includes a general purpose computing device in the form of a computer 610. Components of computer 610 may include, but are not limited to, a processing unit 620, a system memory 630, and a system bus 622 that couples various system components including the system memory to the processing unit 620.

Computer 610 typically includes a variety of computer readable media and can be any available media that can be accessed by computer 610. The system memory 630 may include computer storage media in the form of volatile and/or nonvolatile memory such as read only memory (ROM) and/or random access memory (RAM). By way of example, and not limitation, system memory 630 may also include an operating system, application programs, other program modules, and program data.

A user can enter commands and information into the computer 610 through input devices 640. A monitor or other type of display device is also connected to the system bus 622 via an interface, such as output interface 650. In addition to a monitor, computers can also include other peripheral output devices such as speakers and a printer, which may be connected through output interface 650.

The computer 610 may operate in a networked or distributed environment using logical connections to one or more other remote computers, such as remote computer 670. The remote computer 670 may be a personal computer, a server, a router, a network PC, a peer device or other common network node, or any other remote media consumption or transmission device, and may include any or all of the elements described above relative to the computer 610. The logical connections depicted in FIG. 6 include a network 672, such local area network (LAN) or a wide area network (WAN), but may also include other networks/buses. Such networking environments are commonplace in homes, offices, enterprise-wide computer networks, intranets and the Internet.

As mentioned above, while exemplary embodiments have been described in connection with various computing devices and network architectures, the underlying concepts may be applied to any network system and any computing device or system in which it is desirable to improve efficiency of resource usage.

Also, there are multiple ways to implement the same or similar functionality, e.g., an appropriate API, tool kit, driver code, operating system, control, standalone or downloadable software object, etc. which enables applications and services to take advantage of the techniques provided herein. Thus, embodiments herein are contemplated from the standpoint of an API (or other software object), as well as from a software or hardware object that implements one or more embodiments as described herein. Thus, various embodiments described herein can have aspects that are wholly in hardware, partly in hardware and partly in software, as well as in software.

The word "exemplary" is used herein to mean serving as an example, instance, or illustration. For the avoidance of doubt, the subject matter disclosed herein is not limited by such examples. In addition, any aspect or design described herein as "exemplary" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used, for the avoidance of doubt, such terms are intended to be inclusive in a manner similar to the term "comprising" as an open transition word without precluding any additional or other elements when employed in a claim.

As mentioned, the various techniques described herein may be implemented in connection with hardware or software or, where appropriate, with a combination of both. As used herein, the terms "component," "module," "system" and the like are likewise intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on computer and the computer can be a component. One or more components may reside within a process and/or thread of execution and a component may be localized on one computer and/or distributed between two or more computers.

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it can be noted that one or more components may be combined into a single component providing aggregate functionality or divided into several separate sub-components, and that any one or more middle layers, such as a management layer, may be provided to communicatively couple to such sub-components in order to provide integrated functionality. Any components described herein may also interact with one or more other components not specifically described herein but generally known by those of skill in the art.

In view of the exemplary systems described herein, methodologies that may be implemented in accordance with the described subject matter can also be appreciated with reference to the flowcharts of the various figures. While for purposes of simplicity of explanation, the methodologies are shown and described as a series of blocks, it is to be understood and appreciated that the various embodiments are not limited by the order of the blocks, as some blocks may occur in different orders and/or concurrently with other blocks from what is depicted and described herein. Where non-sequential, or branched, flow is illustrated via flowchart, it can be appreciated that various other branches, flow paths, and orders of the blocks, may be implemented which achieve the same or a similar result. Moreover, some illustrated blocks are optional in implementing the methodologies described hereinafter.

CONCLUSION

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

In addition to the various embodiments described herein, it is to be understood that other similar embodiments can be used or modifications and additions can be made to the described embodiment(s) for performing the same or equivalent function of the corresponding embodiment(s) without deviating therefrom. Still further, multiple processing chips or multiple devices can share the performance of one or more functions described herein, and similarly, storage can be effected across a plurality of devices. Accordingly, the invention is not to be limited to any single embodiment, but rather is to be construed in breadth, spirit and scope in accordance with the appended claims.

What is claimed is:
1. In a computing environment, a system, comprising:
   a primary read cube server coupled to a primary read cube, the primary read cube server configured to handle incoming read queries by returning data from the primary read cube;
   a mirror read cube server coupled to a mirror read cube for the primary read cube, the mirror read cube server configured to handle incoming read queries by returning data from the mirror read cube when the primary read cube server is not operational or when the primary read cube is being synchronized;
   a primary processing cube server coupled to a primary processing cube service and a primary write cube, the primary processing cube service configured to rebuild the primary read cube from a database that is restored from a backup, to write data changes in the database to the primary write cube, and to synchronize the primary read cube and the mirror read cube based on the data changes; and
   a mirror processing cube server coupled to a mirror cube service and a mirror write cube for the primary write cube, the mirror processing cube service configured to write the data changes to the mirror write cube and to synchronize the primary read cube and mirror read cube when the primary processing cube server is not operational or when the primary write cube is not operational.

2. The system of claim 1 wherein the primary read cube server corresponds to a first computing machine or cluster, wherein the mirror read cube server corresponds to a second computing machine or cluster, wherein the primary processing cube server corresponds to a third computing machine or cluster, wherein the mirror processing cube server corresponds to a fourth computing machine or cluster, and wherein the first machine or cluster, second machine or cluster, third machine or cluster and fourth machine or cluster are physically separate from one another.

3. The system of claim 1 further comprising a mirrored SQL database accessible as the backup for the database to the primary processing cube service and to the mirror processing cube service.

4. The system of claim 1 further comprising a database that includes information that indicates which machine is operating as the primary processing cube server and which machine is operating as the mirror processing cube server.

5. The system of claim 1 further comprising a database accessible to the primary processing cube service and to the mirror processing cube service, and wherein the primary processing cube server writes a schedule of operations to the database, the mirror processing cube service further configured to access the schedule of operations to perform any remaining operation or operations of the schedule when the primary processing cube server is not operational.

6. The system of claim 1 further comprising a database accessible to the primary processing cube service and to the mirror processing cube service, and wherein the primary processing cube server writes state information to the database that indicates when a synchronization of the primary read cube server is in progress and that indicates when a synchronization of the primary read cube server is not in progress.

7. The system of claim 6 further comprising a front end server including logic that that accesses the state information and directs read queries to the mirror read cube server when the state information indicates that synchronization of the primary read cube server is in progress.

8. The system of claim 1 wherein the primary processing cube service is further configured to synchronize the mirror write cube.

9. The system of claim 8 wherein the primary processing cube service synchronizes the mirror write cube in a first synchronization operation, then synchronizes the mirror read cube in a second synchronization operation, and then synchronizes the primary read cube in a third synchronization operation.

10. The system of claim 1 wherein the primary processing cube service writes a first timestamp corresponding to the time of synchronization of the read cube to a database, and writes a second timestamp corresponding to the time of synchronization of the read cube to the primary processing write cube, and wherein the primary processing cube service is configured to compare the first and second timestamps with each other before a next synchronization to determine whether the primary processing write cube and the read cube are still synchronized.

11. The system of claim 10 wherein the primary processing cube service performs an incremental synchronization of the primary processing write cube and the read cube when the first and second timestamps indicate the primary processing write cube and the read cube are still synchronized, or performs full cube processing when the first and second timestamps indicate the primary processing write cube and the read cube are not still synchronized.

12. In a computing environment, a method performed at least in part on at least one processor, comprising: handling read queries at a first read server and a first read cube; handling notifications for changes to a database at the first read server by determining whether a primary write cube of a first processing cube server is synchronized with last updated data in the database, and if so, performing an incremental processing operation to update the primary write cube with the changes and if not, performing a full processing operation to synchronize the primary write cube to the database; synchronizing the first read cube from the primary write cube of a first processing cube server, the primary write cube to maintain change data corresponding to incremental data and to synchronize the change data with a mirror write cube; and while synchronizing the first read cube, handling read queries at the second read server and the second read cube.

13. The method of claim 12 further comprising, detecting that the first read cube is being synchronized, and directing read queries to the second read cube server.

14. The method of claim 13 wherein the first processing cube server comprises a processing cube service that synchronizes the first read cube, including writing state information to a database that indicates that synchronization of the first read cube is in progress, and wherein detecting that the first read cube is being synchronized comprises accessing the database to obtain the state information.

15. The method of claim 12 further comprising, handling read queries at the second read server and the second read cube when the first read server or first read cube is not operational.

16. The method of claim 12 wherein synchronizing the first read cube occurs after synchronizing the second read cube.

17. The method of claim 12 further comprising, synchronizing the first read cube from a second write cube of a second processing cube server when the first processing cube server is not operational.

18. In a computing environment, a method performed at least in part on at least one processor, comprising: processing read queries directed to an active read cube at an active read server, including querying a database at a first read server to determine a state of a first read cube, and if the first read cube is active, directing the read queries to the first read server, and if not, directing the read queries to a second read server having a second read cube; and processing cube write data corresponding to data changes in the database, including synchronizing a first write cube of a first write processing server with the data changes to the database, maintaining change data at the first write cube of the first write processing server when that first write processing server and first write cube are operational, maintaining the change data at a second write cube of a second write processing server when the first write processing server or the first write cube is not operational, and synchronizing the change data with at least one of the first read cube or the second read cube.

19. The method of claim 18 wherein determining a state of the first read server comprises querying for state information that indicates whether the first read cube is being synchronized, and if being synchronized, deciding that the first read server is not currently capable of handling the queries and directing the queries to the second read server.

20. The method of claim 18 wherein the first write processing server is operational, wherein the first read server is currently capable of handling the read queries, and wherein the first write processing server synchronizes the write and read cubes based upon the change data in a sequence comprising, synchronizing the second write cube, synchronizing the second read cube, and synchronizing the first read cube.

* * * * *